April 9, 1968 G. J. HILFERINK 3,377,484
OPTICAL FLUFF DETECTING APPARATUS EMPLOYING DUAL LIGHT PATHS
Filed Oct. 20, 1964
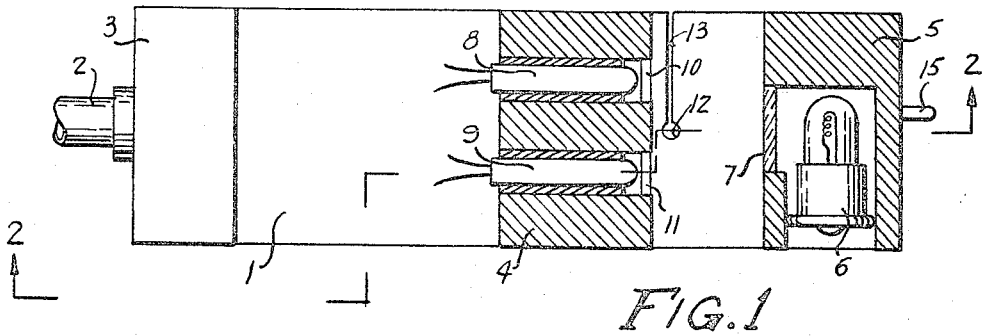
FIG.1
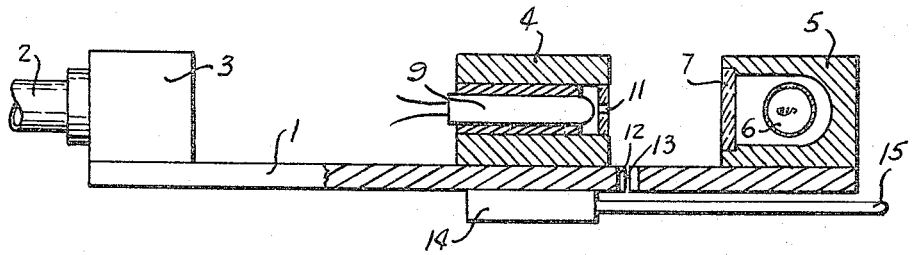
FIG.2
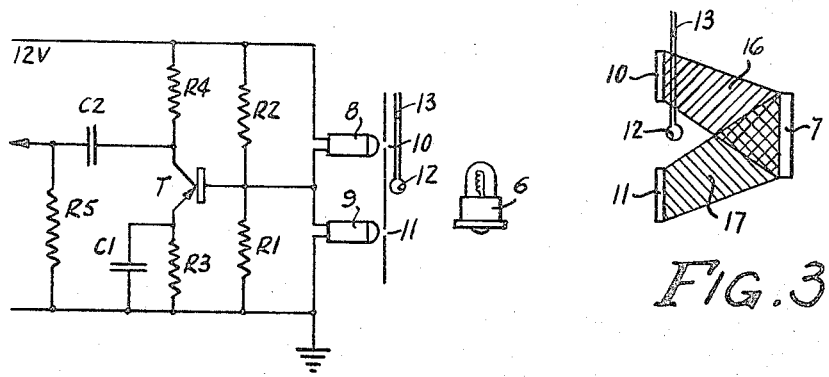
FIG.3
FIG.4
INVENTOR.
GARRIT JOHANNES HILFERINK
BY FRANCIS W. YOUNG
ATTORNEY.

United States Patent Office 3,377,484
Patented Apr. 9, 1968

3,377,484
OPTICAL FLUFF DETECTING APPARATUS EMPLOYING DUAL LIGHT PATHS
Garrit J. Hilferink, Arnhem, Netherlands, assignor to American Enka Corporation, Enka, N.C., a corporation of Delaware
Filed Oct. 20, 1964, Ser. No. 405,211
Claims priority, application Netherlands, Nov. 1, 1963, 300,046
13 Claims. (Cl. 250—219)

ABSTRACT OF THE DISCLOSURE

An apparatus for detecting fluffs on a running thread comprising a source of radiant energy, a pair of light sensitive means, each having a resistance variable with the intensity of radiant energy incident thereon, and being positioned with respect to the source of radiant energy whereby the light sensitive means receive angularly spaced beams of radiant energy from the source of radiant energy, guide means causing a thread to travel perpendicularly to the beams of radiant energy substantially centrally therebetween, so that the thread is spaced from the beams of radiant energy and fluffs on the thread pass into the path of one of said beams to vary the intensity of the radiant energy received by the light sensitive means, screening means in front of the light sensitive means for limiting the beams of radiant energy whereby the noise level caused by vibration of the apparatus is lowered to facilitate detection of the variation of intensity of the radiant energy caused by the fluffs, the light sensitive means being electrically connected in series with two resistor means to define a bridge circuit, the resistance value of the resistor means being substantially lower than the resistance value of the light sensitive means during operation, and with an electronic valve means operatively connected with the bridge circuit between the light sensitive means and the resistor means, and being responsive to variations in the resistance of the light sensitive means to provide an output signal which serves as an indication of the fluffiness of the thread.

---

This invention relates to an apparatus for detecting fluffs on a running thread and drawtwisting machines incorporating such an apparatus, and relates more particularly to an optical fluff detector wherein a running thread is passed perpendicularly between light beams directed from a source of radiant energy to a pair of light sensitive electrical elements positioned at equal distances from, and in different directions with respect to, the source.

As conductive to a better understanding of the instant inventive concept, the following background material should be considered. In continuous filament yarns fluffs are frequently produced by breakage of one or more filaments, the broken ends projecting outwardly from the yarn. The number of fluffs on a given yarn is one of the factors governing the processability of the yarn. Yarns having such fluffs are normally delivered to processing machines such as warping machines, weft-pirn winders, knitting machines, and the like, in the form of packages. In order to assess the quality of the fabric to be woven or knitted from the yarns, it is of great importance to note the degree of fluffiness of the yarn on the packages.

During the warping process, it is known to use an electro-optical system to detect the number of fluffs that are in the passing sheet of yarn before it is wound on the warp beam. This is a means to evaluate the quality of the yarn, but it cannot be used to improve the quality of the final fabric.

It is known that the majority of fluffs in a woven or knitted fabric find their origin in a relatively small portion of the total number of yarn threads of which the product is composed. If it were known how many fluffs there are in each yarn package, it would be relatively simple to obtain a significant improvement in the quality of the woven or knitted fabric by sorting the yarn packages according to the number of fluffs they contain before they are placed on the creel of the warping or knitting machine. This will produce an end product of high quality.

Knowledge of the number of fluffs in a yarn package, and correlation of these values with the source of origin of yarn packages having unduly high number of fluffs, would facilitate determining machine faults responsible for the occurrence of such fluffs.

The device of the instant invention is different from known apparatuses utilized for determining the fluffiness of a spun yarn. Loose fiber ends projecting from this spun yarn will extend into beams of light directed on light sensitive elements resulting in a shadow effect causing the elements to emit signals which may be attenuated to measure the fluffiness. It is obvious that an apparatus which is to indicate the existence of a broken filament in a continuous filamentary yarn with a frequency of one filament rupture per, for example, 20 kilometers of yarn, must satisfy different requirements from an apparatus which is to indicate the degree of voluminosity of a spun yarn. The latter apparatus is practically insensitive to noise from the main current circuit whereas the former apparatus which is to be used on plant machines subject to vigorous vibrations such as draw-twisting machines, will ordinarily be sensitive to noise, especially a strong noise signal caused by resonance of the incandescent filament of the light source which is difficult to distinguish from the weak signal of a passing broken filament or fluff.

Additional disadvantages of prior art devices are their bulkiness and high initial and maintenance costs, particularly due to the necessity of using lens systems with such known devices.

Because of these drawbacks, the use of electro-optical systems for detecting fluffs on plant machines such as drawtwisting machines is frequently discounted. Instead, other systems have been developed to detect broken filaments such as the use of scanning devices which respond to the electrostatic charge present on the filaments and the fluffs. Such systems have numerous disadvantages, particularly in that they cannot be used if the threads carry only a small electrostatic charge such as threads with a high percentage of absorbed moisture or threads treated with an antistatic agent.

It is therefore the primary object of the instant invention to provide an apparatus for detecting fluffs on a running thread free from the foregoing and other disadvantages.

Another object of the instant invention is the provision of an apparatus of the type described which can be readily incorporated into a drawtwisting machine or the like and a drawtwisting machine or the like having such an apparatus incorporated therein.

A further object of this invention is to provide an apparatus for detecting fluffs utilizing an electro-optical system subjected to a surprisingly low noise level as compared with that of the signal emitted by a passing fluff, even if no special steps are taken to mount the apparatus so that it is not subject to vibration.

The objectives of this invention are accomplished by providing a source of radiant energy in the form of an electric lamp having an opal glass positioned in front of it with a pair of light sensitive elements including photodiodes connected in series with two resistor means in a bridge circuit, the resistance value of the resistor means being very much lower than that of the photodiodes during operation, the light sensitive element being placed at equal distances from, and in different directions with respect to, the source of radiant energy whereby the light sensitive elements receive beams of radiant energy from the source, with guide means constraining the thread to travel perpendicularly to the beams substantially centrally therebetween near the boundaries thereof, the bridge circuit being branched off in the middle from between the photodiodes and the resistor means to connect it with the base of a transistor acting as an electronic valve means to provide an output signal responsive to variations in the resistance of the photodiodes occasioned by variations of the intensity of the radiant energy incident thereon due to passing fluffs.

Such an apparatus has the additional advantage that the signal emitted need only be amplified a slight amount to, for instance, put a counting device into operation.

In accordance with the preferred embodiment of the instant inventive concept, the photodiodes are normally screened off except for two narrow slits in line with each other interposed between the photodiodes and the source of radiant energy, the width of the slits preferably being no more than 0.2 millimeter. The shadow thrown on a photodiode by a loose fiber forming a fluff is seldom larger than the surface area of the slits whereby such screening hardly attenuates the shadow signal received by the photodiodes while the noise level caused by the vibrating incandescent filament of the light source is consistently lower than in the case of larger apertures for the photodiodes.

While the relationship of the various parts of the apparatus of the instant invention may be varied, a particularly favorable embodiment has been found to be effected when a substantially equilateral triangle is defined by a line connecting the slits in front of the photodiodes with the inner boundaries of the beams of radiant energy received by the photodiodes from the source, the sides of the equilateral triangle being less than 6 millimeters and preferably about 4 millimeters, with the thread being constrained to travel through the triangle substantially at the center of gravity of the same.

Further advantage can be obtained according to the instant invention if the electric lamp defining the source of radiant energy is supplied with only about half the voltage for which it is normally designed. With such a relationship, even extremely high vibrations from the machine in which the apparatus is being utilized will not substantially decrease the life of the lamp.

In order to prevent the center branch of the bridge circuit from emitting signals to the transistor in the event of variations in the intensity of the light source, for example, if the electric lamp is supplied with an alternating voltage, the photodiodes as well as the resistors of the bridge circuit must be perfectly identical. Since this cannot be realized in practice, an adjustable element is included in the bridge circuit. A particularly simple construction is obtained if the photodiodes are asymmetrically directional, and if at least one of them is adjustable about its longitudinal axis.

Noise of unknown origin may be even further suppressed without appreciably weakening the signal to be emitted by detection of a fluff by providing a frequency filter which attenuates signals lower than 2,000 cycles per second.

Although the apparatus of this invention in its broadest sense may be incorporated into widely varying types of textile machines, the invention relates in particular to a drawtwisting machine in which the traversing thread guide or the top eyelet of the winding mechanism defines a part of the guide means constraining the thread to the above-described relationship with respect to the optical detecting means. In the case of such a drawtwisting machine, the yarn is inspected for fluffs just before it is wound on the pirn ready for dispatch. It is then practically impossible that such a yarn package would contain undetected fluffs formed after this final inspection.

Other and further objects reside in the combination of elements, arrangement of parts and features of construction.

Still other objects will in part be obvious and in part be pointed out as the description of the invention proceeds and as shown in the accompanying drawing wherein:

FIGURE 1 is a top view, partly in plan and partly in cross-section, showing a fluff detector apparatus in accordance with the instant inventive concept;

FIGURE 2 is a side view of the apparatus, partly in elevation and partly in cross-section, taken substantially on line 2—2 of FIGURE 1;

FIGURE 3 is a schematic representation of the preferred arrangement of the beams of radiant energy in accordance with this invention; and FIG. 4 is a schematic diagram of the electrical circuit for the apparatus.

Like reference characters refer to like parts throughout the several views of the drawing.

Referring now to the drawing, the reference numeral 1 identifies a base plate for the apparatus on which is mounted three blocks 3, 4, and 5, the block 3 carrying a support 2 which serves to attach the apparatus to a machine frame (not shown).

A hole is bored in one side of the block 5 to house an electric lamp 6 supported in any conventional manner such as by being cemented to the bore. In the preferred construction, if the lamp 6 is an 18 volt bulb, it is connected to a 9 volt current source (not shown).

In the wall of the block 5 facing the block 4, an opening is defined in which is mounted an opal glass 7 which is evenly illuminated by the lamp 6 and consequently serves as a source for the radiation of diffuse light.

Symmetrical with the opal glass 7 and mounted in parallel bores in the block 4 are two photodiodes 8 and 9. The photodiodes are of the OAP 12 type showing a light sensitivity which is asymmetrically directional. The light sensitive ends of the photodiodes 8 and 9 are directed toward the opal glass 7. In this way, it is possible, by rotating the photodiodes about their longitudinal axes, to find a position in which they emit signals which are of equal strength as a result of two equally strong light signals received from the lamp 6.

In order to reduce to a minimum the sensitivity of the photodiodes to variations in the light intensity of the source of radiant energy they are largely screened off in such a way that the light must pass through two relatively narrow slits 10 and 11 defined by the block 4 which acts as a screening means. Preferably, the slits 10 and 11 measure approximately 8 millimeters in length and 0.2 millimeter in width, thereby defining the inner and outer boundaries of the light beams 16 and 17 from the lamp 6 before the radiant energy is received by the photodiodes.

A hole 12 is defined in the baseplate 1 between the blocks 4 and 5 to define a guide for passage of a thread (not shown) which is to be inspected for fluffs. The hole 12 may serve, for instance, as the top outlet for the winding spindle of a draw-twisting machine (not shown) which is of a type known per se. To facilitate the threading of a yarn through the hole 12, a slit 13 is provided running from the hole 12 to the side of the baseplate 1. A crosspin 15 is attached to the baseplate 1 by means of a block 14 to prevent the thread from sliding through the slit 13.

Referring particularly to FIGURE 3, the areas 16 and 17 define the beams of light passing from the lamp 6 through the slits 10 and 11. The inner boundaries of these beams and a line connecting the slits 10 and 11 define an equilateral triangle which, as pointed out hereinabove, preferably has sides less than six millimeters in length and more preferably approximately four millimeters in length. The guide means including the hole 12 constrain the thread to travel perpendicularly to the beams 16 and 17 substantially through the center of gravity of the triangle. A smooth thread will not normally incite signals in the photodiodes 8 and 9. However, a fluff on the thread passes into the path of one of the beams thereby varying the radiant energy received by the photodiodes and inciting a signal in a manner now to be described.

FIGURE 4 shows the photodiodes 8 and 9 connected in series with resistors R1 and R2, preferably each of 22 kiloohms, in a bridge circuit to which a direct current of 12 volts is applied. This bridge circuit is branched off in the middle from between the photodiodes and the resistors to connect the same to the base of a transistor T fed by the same 12 volt current source. Current through the transistor T at zero load and the voltage at the collector are adjusted to their correct values by means of resistors R3 and R4, respectively. The capacitor C1 and one or more frequency filters of the type indicated by C2 and R5 determine the strength and the frequency spectrum of the signal to be emitted by the circuit.

The space between the blocks 3 and 4 may be covered by a cap (not shown) to enclose the circuit elements.

It will now be seen that there is herein provided an improved apparatus for detecting fluffs on a running thread which may be incorporated into a drawtwisting machine or the like and which satisfies all of the objectives of the instant invention, and others, including many advantages of great practical utility and commercial importance.

Since many embodiments may be made of the instant inventive concept, and since many modifications may be made of the embodiments hereinbefore shown and described, it is to be understood that all matter herein is to be interpreted merely as illustrative and not in a limiting sense. Accordingly,

What is claimed is:

1. An apparatus for detecting fluffs on a running thread comprising a source of radiant energy, a pair of light sensitive means each having a resistance variable with the intensity of radiant energy incident thereon, said light sensitive means being positioned at equal distances from, and in different directions with respect to, said source of radiant energy whereby said light sensitive means receive angularly spaced beams of radiant energy from said source, guide means constraining the thread to travel perpendicularly to said beams of radiant energy substantially centrally therebetween, the thread normally being spaced from said beams of radiant energy and fluffs on the thread passing into the path of one of said beams to vary the intensity of the radiant energy received by said light sensitive means, screening means in front of said light sensitive means for limiting the beams of radiant energy whereby the noise level caused by vibration of the apparatus is lowered to facilitate detection of the variation of intensity of the radiant energy caused by said fluffs, said light sensitive means being electrically connected in series with two resistor means to define a bridge circuit, the resistance value of said resistor means being substantially lower than the resistance value of said light sensitive mean during operation, and with an electronic valve means operatively connected with said bridge circuit between said light sensitive means and said resistor means and being responsive to variations in the resistance of said light sensitive means to provide an output signal which provides an indication of the fluffiness of said thread.

2. An apparatus in accordance with claim 1 wherein said source of radiant energy comprises an electric lamp having an opal glass interposed between it and said light sensitive means.

3. An apparatus in accordance with claim 2 wherein said lamp is designed for ordinary use with a predetermined voltage, and it is supplied with only approximately half said predetermined voltage.

4. An apparatus in accordance with claim 1 wherein said electronic valve means is a transistor having a base electrically connected to said bridge circuit between said light sensitive means and said resistor means.

5. An apparatus in accordance with claim 4 further including a filter operatively connected to said transistor for attenuating signals of frequencies less than 2,000 cycles per second.

6. An apparatus in accordance with claim 1 wherein each of said light sensitive means comprises a photodiode.

7. An apparatus in accordance with claim 6 wherein said photodiodes are asymmetrically directional and at least one of said photodiodes is adjustable about its longitudinal axis.

8. An apparatus in accordance with claim 1 wherein said screening means defines narrow slits interposed between each of said light sensitive means and said source of radiant energy to limit the inner and outer boundaries of said beams of radiant energy, a triangle being defined by a line connecting said beams of radiant energy and the thread being constrained by said guide means to travel through said triangle substantially at the center of gravity of the same.

9. An apparatus in accordance with claim 8 wherein said slits have a width of approximately 0.2 millimeter.

10. An apparatus in accordance with claim 8 wherein said triangle is equilateral having sides each less than approximately 6 millimeters.

11. An apparatus in accordance with claim 10 wherein said triangle has sides of approximately 4 millimeters.

12. An apparatus for detecting fluffs on a running thread comprising a source of light, two light-sensitive elements placed at equal distances from, and in different directions in respect to, said source of light whereby a beam of light is received by each light sensitive element from said source, thread guides insuring that the thread travels perpendicularly to said beams, substantially centrally therebetween, and near the boundaries thereof, said source of light including an electric lamp having an opal glass positioned between it and said light sensitive elements, screening means for limiting the beams of light received by each light sensitive element, whereby the noise level caused by vibration of the apparatus is lowered to facilitate detection of the variation of intensity of the light caused by fluffs on said thread, said light sensitive elements including photodiodes connected in series with two resistors in a bridge circuit, the resistance value of said resistors being substantially lower than of said photodiodes during operation, and a transistor having a base, the bridge circuit being branched off in the middle between said photodiodes and said resistors and connected with said base of said transistor whereby the variation of the intensity of the light received by said light sensitive elements produces a signal which is an indication of the fluffiness of said thread.

13. In a drawtwisting machine including a thread guide immediately prior to the winding of a yarn package, the improvement which comprises an apparatus for detecting fluffs on a thread being wound to form the yarn package, said apparatus including a source of radiant energy, a pair of light sensitive means each having a resistance variable with the intensity of radiant energy incident thereon, said light sensitive means being positioned at equal distances from, and in different directions with respect to, said source of radiant energy whereby said light sensitive means receive angularly spaced beams of radiant energy from said source, guide means including the drawtwisting machine thread guide immediately prior to the winding of the yarn package, said guide means constraining the thread to travel perpendicularly to said beams of radiant energy, substantially centrally therebetween, the thread normally being spaced from said beams of radiant energy and fluffs on the thread passing into the path of one of said beams to vary the intensity of the radiant energy received by said light sensitive means, screening means in front of said light sensitive means for limiting the beams of radiant energy whereby the noise level caused by vibration of the apparatus is lowered to facilitate detection of the variation of intensity of the radiant energy caused by said fluffs, said light sensitive means being electrically connected in series with two resistor means to define a bridge circuit, the resistance value of said resistor means being substantially lower than the resistance value of said light sensitive means during operation, and an electronic valve means operatively connected with said bridge circuit between said light sensitive means and said resistor means and being responsive to variations in the resistance of said light sensitive means to provide a signal which serves as an indication of the fluffiness of said thread.

References Cited

UNITED STATES PATENTS

| | | | |
|---|---|---|---|
| 2,139,474 | 12/1938 | Shepard | 250—219 |
| 2,372,162 | 3/1945 | Ryan | 250—219 |
| 2,991,685 | 7/1961 | Van Dongeren | 250—219 |

RALPH G. NILSON, *Primary Examiner.*

MARTIN ABRAMSON, *Assistant Examiner.*